(12) United States Patent
Ohira et al.

(10) Patent No.: US 6,718,188 B1
(45) Date of Patent: Apr. 6, 2004

(54) MOBILE WIRELESS APPARATUS

(75) Inventors: Akinori Ohira, Kanagawa (JP);
Nobutoshi Hamada, Tokyo (JP);
Takefumi Ishida, Kanagawa (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 517 days.

(21) Appl. No.: 09/708,956

(22) Filed: Nov. 8, 2000

(30) Foreign Application Priority Data

Nov. 12, 1999 (JP) ............................................ 11-322943

(51) Int. Cl.⁷ ................................................ H04M 1/00
(52) U.S. Cl. ............... 455/575.1; 455/90.3; 379/433.07
(58) Field of Search ............................... 455/90.1–90.3, 455/351, 550, 575.1; 341/22; 379/368, 433.07; 200/5 R, 5 A, 512, 517; 361/680, 683; 400/490, 491, 495, 496; 345/168, 169, 901

(56) References Cited

U.S. PATENT DOCUMENTS

| | | | | |
|---|---|---|---|---|
| 4,203,016 A | | 5/1980 | Twyford | 200/159 R |
| 4,314,116 A | * | 2/1982 | Gordon | 200/5 A |
| 5,235,636 A | * | 8/1993 | Takagi et al. | 379/368 |
| 5,247,143 A | * | 9/1993 | Suwa | 200/517 |
| 5,982,881 A | | 11/1999 | Mischenko | 379/433 |
| 6,207,912 B1 | * | 3/2001 | Persson | 200/305 |
| 6,229,994 B1 | * | 5/2001 | Pavet | 455/575.1 |

* cited by examiner

*Primary Examiner*—Vivan Chin
*Assistant Examiner*—Tuan Tran
(74) *Attorney, Agent, or Firm*—Pearne & Gordon LLP (57) ABSTRACT

The mounting portion formed on the cover (1) is provided with a fitting boss (8) in a fitting recess (7). On the other hand, the mounting portion formed on the key sheet (3) is provided with fitting recess (10) in the fitting boss (9). The key sheet (3) is constructed in such a manner that the packaged component (11) is placed between the key sheet (3) and the printed substrate (12).

12 Claims, 5 Drawing Sheets

MOBILE WIRELESS APPARATUS

BACKGROUND OF THE INVENTION

The present invention relates to a mobile wireless apparatus and, more specifically, to a mobile wireless apparatus wherein a key sheet is easily attached by press fitting and hardly detached after fitted once.

Currently, slimming down, downsizing, and cost reduction by mass production are indispensable conditions in manufacturing of mobile wireless apparatus, and efforts are being made by each manufacturer from day to day. Therefore, the key sheet as one of its internal components is also required to be slimmed and downsized, and simultaneously, it is required to be easily attached and hardly detached even though it is slimmed, downsized, and manufactured in quantity.

Figure 7:
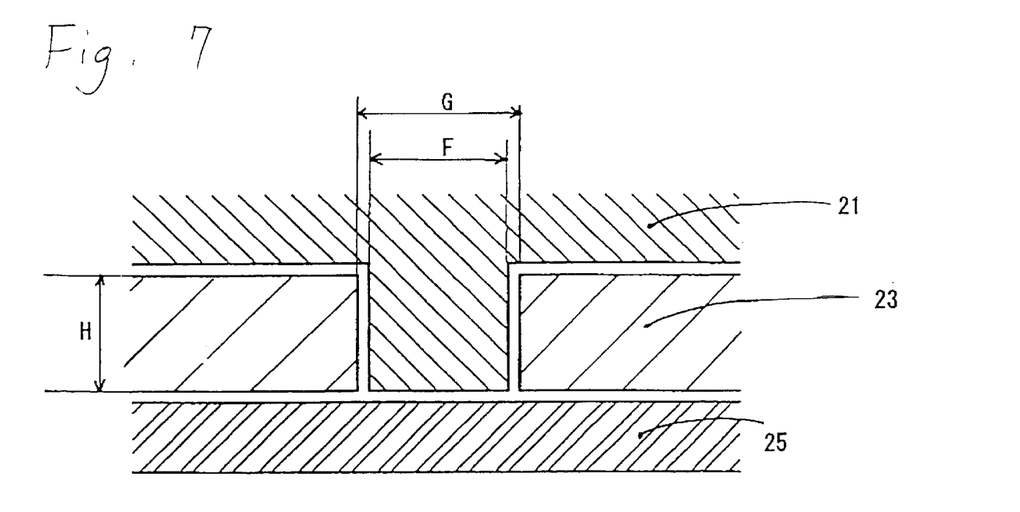
FIG. 7 is a cross sectional view showing the structure of the mounting portion provided on the key sheet and the structure of the mounting portion provided on the cover according to the first conventional example.
Figure 8:
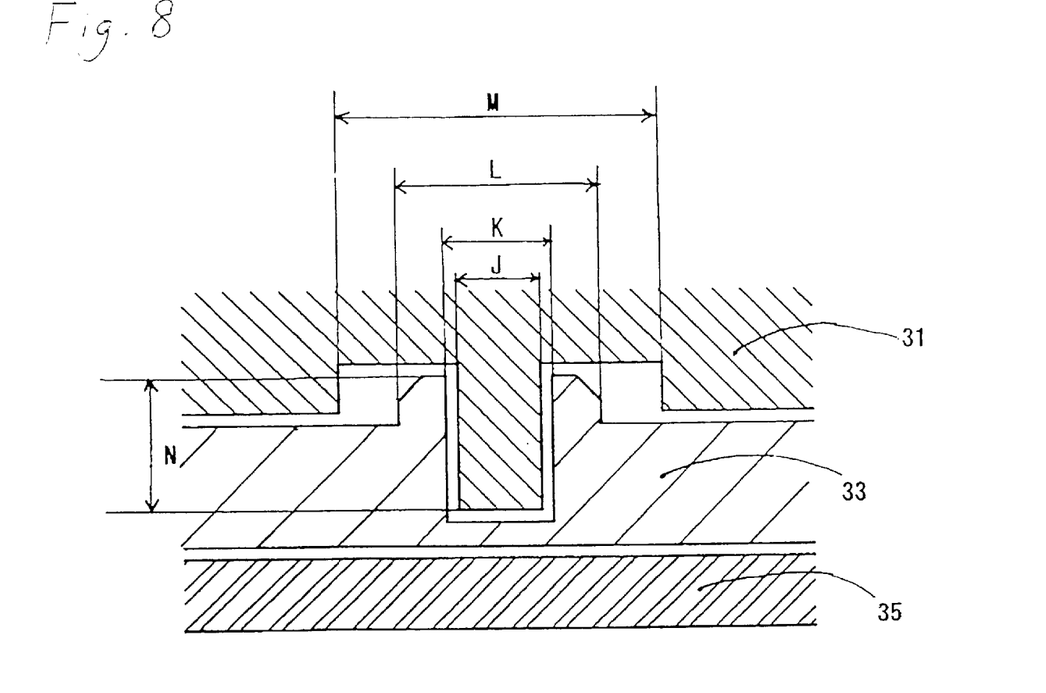
FIG. 8 is a cross sectional view showing the structure of the mounting portion provided on the key sheet and the structure of the mounting portion provided on the cover according to the second conventional example.

However, when the key sheet is mounted to the cover of an mobile wireless apparatus in conventional manufacturing process, giving a priority to mass production may result in one of the design in which both of attachment and detachment are easily made as shown in FIG. 7, or the design in which attachment is easy but the position of installation is limited due to the layout of the packaged components as shown in FIG. 8. When mass production is not taken into account, as shown in FIG. 9, though installation is not limited by the layout of the packaged components, precise dimensioning in the structure makes it hard to be detached, but hard to be attached.

Figure 9:
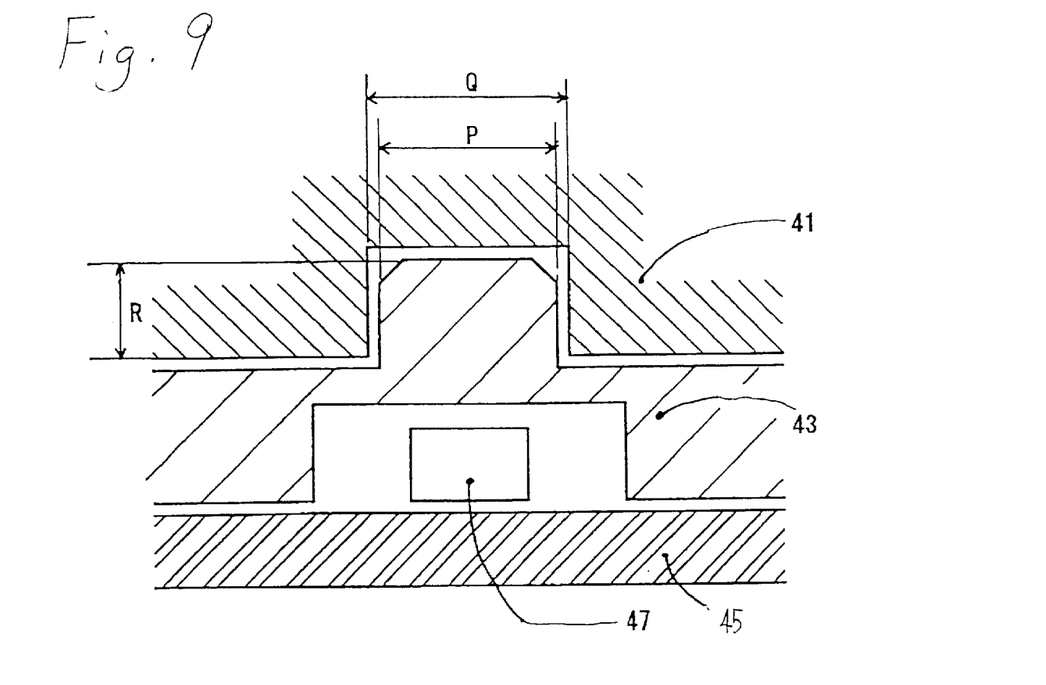
FIG. 9 is a cross sectional view showing the structure of the mounting portion provided on the key sheet and the structure of the mounting portion provided on the cover according to the second conventional example.

FIG. 7 to FIG. 9 are cross-sectional views showing the fitting projection formed on the cover and the fitting recess formed on the key sheet. Though there is shown a clearance between the fitting projection and the fitting recess for the purpose of explanation, the diameter G of the fitting hole as a fitting recess formed on the key sheet 23 is smaller than the outer diameter F of the fitting projection formed on the cover 21, so that the key sheet 23 is attached to the cover 21 by press-fitting the fitting projection into the fitting recess in the case of FIG. 7. Consequently, there is a problem in that it can be fitted easily, but detached easily. In addition, in FIG. 7, the height of engagement H cannot be sufficiently provided due to slimmed design thereof.

In FIG. 8, there is shown a structure in which a fitting recess is provided also around the fitting projection on the cover 31, a fitting projection is provided also around the fitting recess on the key sheet 33, the inner diameter K of the fitting recess on the key sheet 33 is determined so as to be smaller than the outer diameter J of the fitting projection formed on the cover, and the inner diameter M of the fitting recess formed around the fitting projection on the cover 31 is determined so as to be larger than the outer diameter L of the fitting projection around the fitting recess of the key sheet 33. In the example shown in FIG. 8, though the key sheet can be easily attached and the height of engagement N can be freely provided, there is a problem in that the positions to form the fitting projection and the fitting recess in order to establish the height of engagement N are limited due to the layout of the packaged components. In addition, this structure is affected by its slimmed design.

In the structure shown in FIG. 9, when a packaged component 47 is placed on the printed board 45, the key sheet 43 is provided with a clearance recess of larger size than the packaged component 47 so that the layout of the packaged components does not have effect on the design of the key sheet. However, since the outer diameter P of the fitting projection formed on the key sheet 43 is determined to be the value close to the inner diameter Q of the fitting recess formed on the cover 41 and the key sheet 43 is attached to the cover 41 by press fitting, the key sheet resists mounting and removing. In a structure shown in FIG. 9, though the height of engagement R is freely established, it is affected by the slimmed design.

SUMMARY OF THE INVENTION

The present invention is intended to solve the problems described above, and an object of the present invention is to provide a mobile wireless apparatus wherein the key sheet is easily attached to the cover by press fitting and hardly detached therefrom after fitted once.

The first aspect of the present invention is a mobile wireless apparatus having a key controlling panel constructed by joining a key sheet having key tops thereon and a cover having holes into which the key tops are inserted, wherein there are provided a first fitting recess and a first fitting projection in the first fitting recess on one of the cover and the key sheet, and a second fitting projection and a second fitting recess in the center of the second fitting projection on the other one of the cover and the key sheet so that the fitting recess and the fitting projection are press fitted when inserting the key tops into the key top holes.

This construction ensures that the key sheet is easily attached and hardly detached after fitted once.

The second aspect of the present invention is a mobile wireless apparatus according to the first aspect, wherein the first fitting projection formed on the center of first the fitting recess and the second fitting recess formed on the center of the second fitting projection are interference fitted with respect to each other. The third aspect of the present invention is a mobile wireless apparatus according to the first aspect, wherein fitting relationship between the first fitting projection formed on the center of the first fitting recess and the second fitting recess formed on the center of the second fitting projection is a interference fit, and fitting relationship other than the fitting relationship between the second fitting recess formed on the center of the center of the second fitting projection and the first fitting projection formed on the center of the first fitting recess is a clearance fit.

In this arrangement, in the invention according to the second aspect and the third aspect, the second fitting recess formed on the center of the second fitting projection is widened by the interference fit, and thus the fitting relationship therearound other than that between the first fitting recess formed in the center of the first fitting projection and the second fitting projection formed on the center of the second fitting recess becomes a interference fit, whereby the key sheet is easily fitted to the cover and hardly detached after fitted once.

The fourth aspect of the present invention is a mobile wireless apparatus having a key controlling panel constructed by joining a key sheet having key tops thereon and a cover having holes into which the key tops are inserted, wherein the cover is provided with a first fitting recess and a first fitting projection within the first recess, and the key sheet is provided with a second fitting projection and a second fitting recess in the center of the second projection, so that the fitting recess and the fitting projection is press fitted when inserting the key tops into the key top holes.

This construction ensures that the key sheet is easily attached to the cover and hardly detached therefrom after fitted once.

The fifth aspect of the present invention is a mobile wireless apparatus according to the fourth aspect, wherein the fitting projection formed in the fitting recess is a boss erecting on the cover.

This construction ensures that the key sheet is easily attached and hardly detached after fitted thereon though the structure is simple.

The sixth aspect of the present invention is a mobile wireless apparatus according to the fifth aspect, wherein the configuration of the boss is cylindrical.

This construction ensures that the key sheet is easily attached and hardly detached after fitted once.

The seventh aspect of the present invention is a mobile wireless apparatus according to the fourth aspect, wherein the fitting first recess having a first fitting projection therein formed on the cover is formed symmetrically about the vertical centerline of the cover, and the first fitting recess formed on the upper end of the cover is positioned on the left and right ends of the cover, and the first fitting recess formed on the lower end is located in the vicinity of the vertical centerline of the cover.

This construction ensures that the key sheet is easily attached and hardly detached after fitted once regardless even though only small numbers of fixing positions can be provided due to downsizing.

The eighth aspect of the present invention is a mobile wireless apparatus according to the seventh aspect, wherein the first fitting recess formed on the upper end is deeper than the first fitting recess formed on the lower end.

This construction ensures that the key sheet is easily attached and hardly detached after fitted once. The ninth aspect of the present invention is a mobile wireless apparatus according to the fourth aspect, wherein the fitting projection having a second fitting recess in the center formed on the key sheet is hollow cylindrical shape formed of the same material as the key sheet.

This construction ensures that the key sheet is easily attached and hardly detached after fitted once though the construction is simple.

The tenth aspect of the present invention is a mobile wireless apparatus according to the ninth aspect wherein the key sheet is formed of silicone rubber.

This construction ensures that the key sheet is easily attached and hardly detached after fitted once though the construction is simple.

The eleventh aspect of the present invention is a mobile wireless apparatus according to the fourth aspect, wherein the second fitting projection having a second fitting recess in the center formed on the key sheet is formed symmetrically about the vertical centerline of the key sheet, and the second fitting projection formed on the upper end is positioned on the left and right ends of the key sheet, and the second fitting projection formed on the lower end is located in the vicinity of the vertical centerline of the key sheet.

This construction ensures that the key sheet is easily attached and hardly detached after fitted once even though only small numbers of fixing positions can be provided due to downsizing.

The twelfth aspect of the present invention is a mobile wireless apparatus according to the eleventh aspect, wherein the second fitting projection formed on the upper end thereof is higher than the second fitting projection formed on the lower end thereof.

This construction ensures that the key sheet is easily attached and hardly detached after fitted once.

DETAILED DESCRIPTION OF THE PREFERRED EMBODIMENTS

Referring now to FIG. 1 to FIG. 6, an embodiment of the present invention will be described.

Figure 1:
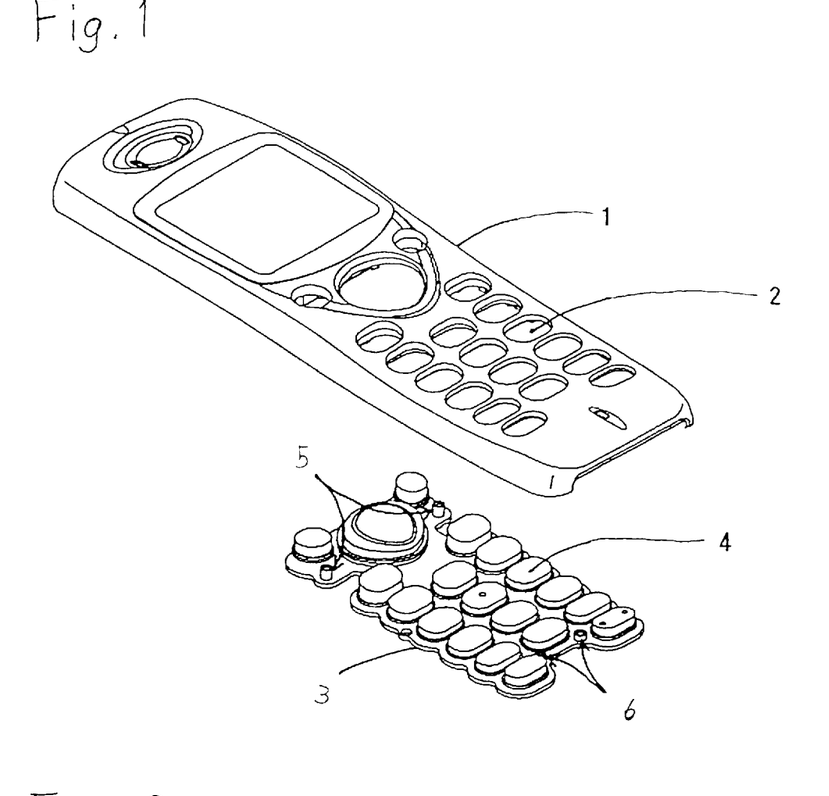
FIG. 1 is an exploded perspective view showing a cover and a key sheet of the mobile wireless apparatus according to an embodiment of the present embodiment.
Figure 2:
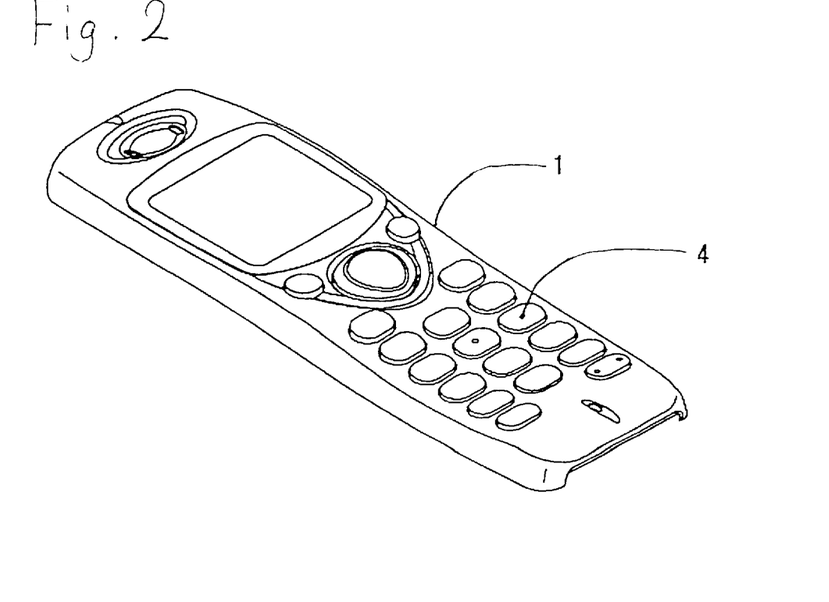
FIG. 2 is a perspective view showing a state in which the key sheet is attached on the cover of the mobile wireless apparatus according to an embodiment of the present invention.
Figure 3:
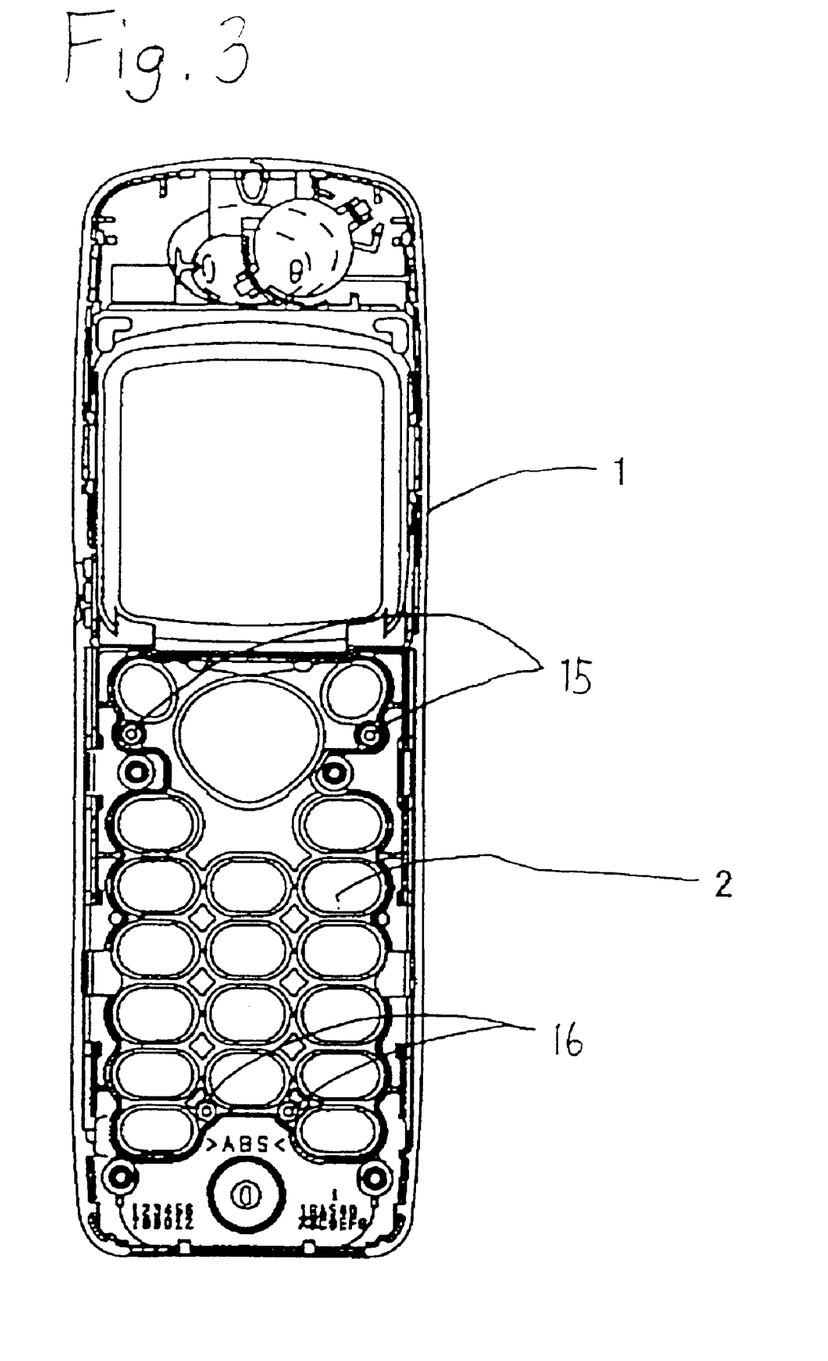
FIG. 3 is a back view of the cover of the mobile wireless apparatus according to an embodiment of the present invention.

FIG. 1 is an exploded perspective view showing a cover 1 and a key sheet 3 of a mobile wireless apparatus according to an embodiment of the present invention. FIG. 2 is a perspective view showing a state in which the key sheet 3 is attached to the cover 1 of the mobile wireless apparatus according to an embodiment of the present invention. FIG. 3 is a back view of the cover 1 of the mobile wireless apparatus according to an embodiment of the present invention.

In FIG. 1, the cover 1 of the mobile wireless apparatus is provided with key top holes 2 through which key tops 4 mounted on the key sheet 3 are inserted. On the key sheet 3, there are provided key tops 4, and key sheet-side first mounting portions 5 and key sheet-side second mounting portions 6 whereby the key sheet 3 is press fitted to the cover 1.

Then, the key sheet 3 is mounted to the cover 1 as shown in FIG. 2. In this case, as shown in FIG. 3, the cover 1 is provided with cover-side first mounting portions 15 and cover-side second mounting portions 16 corresponding to the key sheet-side first mounting portions 5 and the key sheet-side second mounting portions 6 provided on the key sheet 3.

Figure 4:
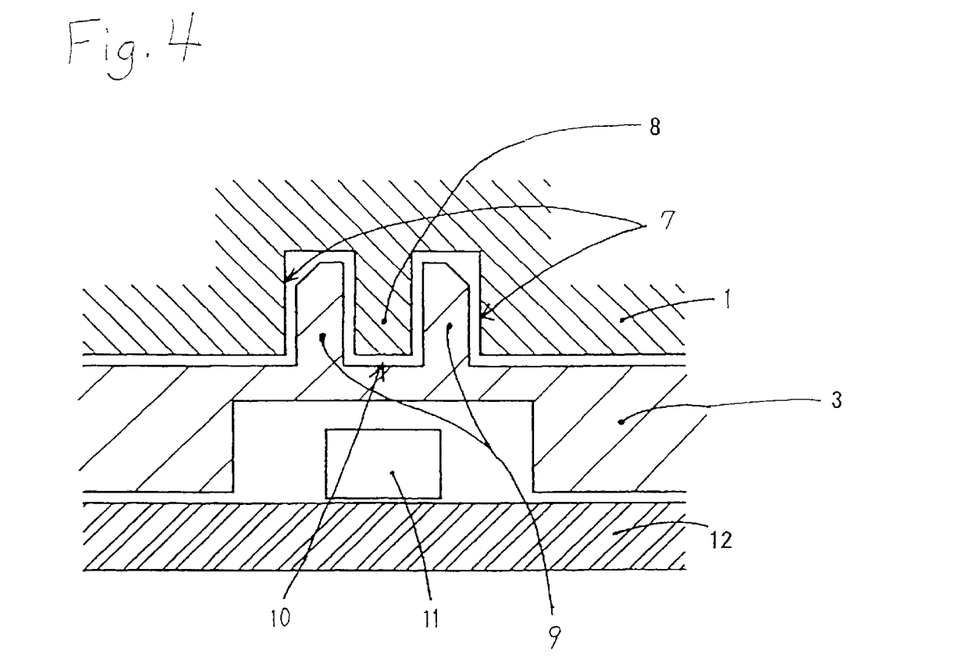
FIG. 4 is a cross sectional view showing the structure of the mounting portion provided on the key sheet, and the mounting portion provided on the cover.
Figure 5:
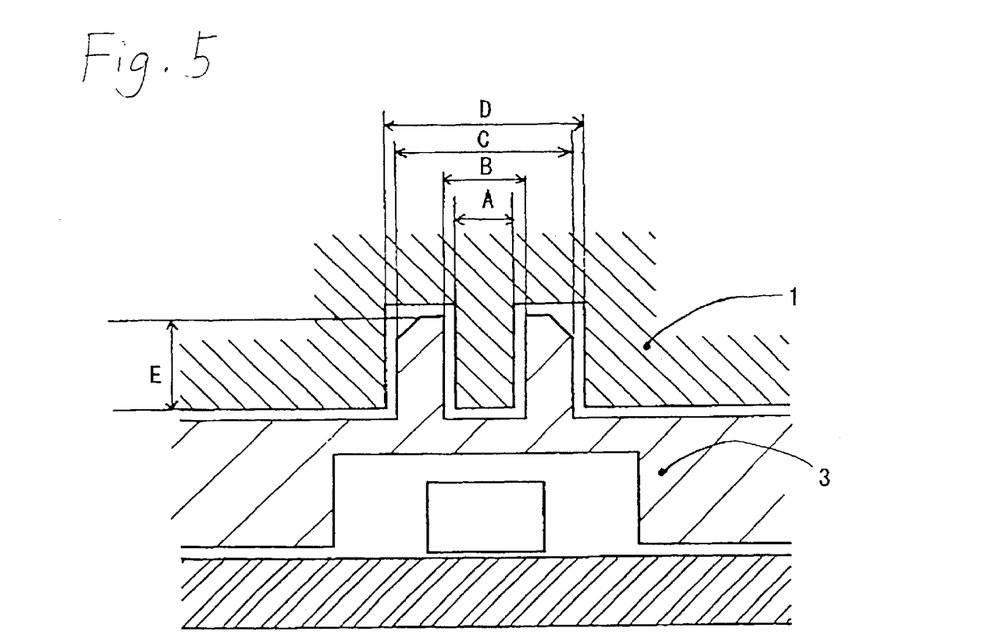
FIG. 5 is an explanatory cross section showing the dimensional relationship of the structure shown in FIG. 4.
Figure 6:
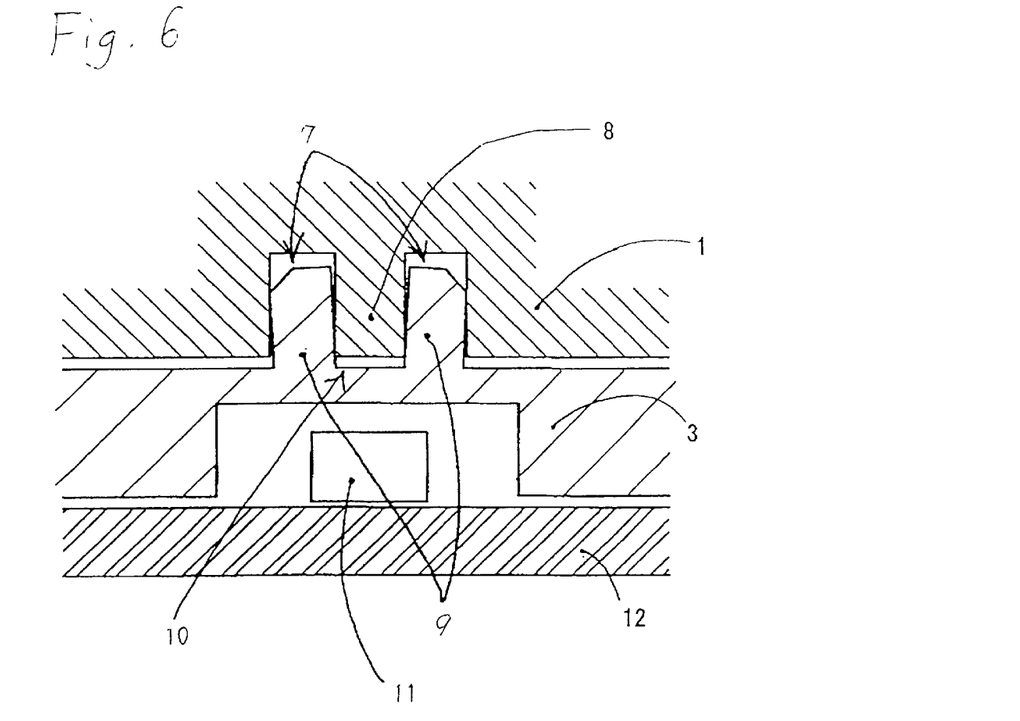
FIG. 6 is a cross sectional view showing the state of actual fitting of the structure shown in FIG. 5.

FIG. 4 to FIG. 6 show the construction of the mounting portion provided on the key sheet 3 and the construction of the mounting portion provided on the cover 1.

As shown in FIG. 4, the cover-side mounting portion 15 or 16 formed on the cover 1 includes a cover-side fitting boss (central boss) 8 in a cover-side fitting recess 7. On the other hand, the key sheet-side mounting portion 5 or 6 formed on the key sheet 3 includes a key sheet-side fitting recess (hollow recess) 10 in a key sheet-side fitting boss 9. In the example shown in FIG. 4, the key sheet 3 is formed in such a manner that the packaged component 11 may be mounted between the key sheet 3 and the printed board 12.

FIG. 5 is an explanatory cross section showing the dimensional relationship of the structure shown in FIG. 4. In the figure, though there is shown a clearance between the key sheet-side fitting boss 9 and the key sheet-side fitting recess 10, the inner diameter B of the fitting recess (hollow recess) 1 is actually determined to be slightly smaller than the outer diameter A of the fitting boss (central boss) 8. The inner diameter D of the cover-side fitting recess 10 is slightly larger than the outer diameter C of the key sheet-side fitting boss 9. The height of the engagement E is determined by the amount of insertion with respect to each other.

FIG. 6 is an explanatory cross section showing the state of actual fitting of the structure shown in FIG. 5. In FIG. 6, by press-fitting the cover-side fitting boss 8 of dimension A described in conjunction with FIG. 5 into the key sheet-side fitting recess 10 of dimension B, the key sheet-side fitting boss 9 of dimension C bulges outwardly since the key sheet 3 is formed of rubber. Therefore, the preset clearance is gone and dimension C becomes almost the same as dimension D of the fitting recess, thereby generating a press fit between dimension C and dimension D. In this manner, double press fits between dimension A and dimension B, and between dimension C and dimension D facilitate mounting and resist detachment.

In the description of the embodiment described above, the cover is provided with a fitting recess and a fitting projection in the recess, and the key sheet is provided with a fitting projection and a fitting recess in the fitting projection. However, it is also possible to provide a fitting recess and a fitting projection formed therein on the key sheet, and a fitting projection and a fitting recess formed in the center thereof on the cover.

In the embodiment described above, the fitting projection formed in the fitting recess is formed on the cylindrical boss erected on the cover symmetrically about the vertical centerline of the cover so as to be easily attached and hardly detached. The distances of the recesses from the centerline on the upper end differ from those on the lower end so as to resist detachment. The depths of the recesses on the upper end are also different from that of the lower end so as to resist detachment. As regards material, the key sheet is formed of silicone rubber, and the fitting projection having a recess is formed of the same material as the key sheet.

As described thus far, the first aspect of the present invention is a mobile wireless apparatus having a key controlling panel constructed by joining a key sheet having key tops thereon and a cover having holes into which the key tops are inserted, wherein there are provided a first fitting recess and a first fitting projection in the first fitting recess on one of the cover and the key sheet, and a second fitting projection and a second fitting recess in the center of the second projection on the other one of the cover and the key sheet so that the fitting recess and the fitting projection are press fitted when inserting the key tops into the key top holes, thereby having an advantage in that the key sheet is easily attached to the cover by press fitting and hardly detached therefrom after fitted once.

The second aspect of the present invention is a mobile wireless apparatus according to the first aspect, wherein the first fitting projection formed on the center of the first fitting recess and the second fitting recess formed on the center of the second fitting projection are interference fitted with respect to each other. The third aspect of the present invention is a mobile wireless apparatus according to the first aspect, wherein fitting relationship between the first fitting projection formed on the center of the first fitting recess and the second fitting recess formed on the center of the second fitting projection is a interference fit, and fitting relationship other than the fitting relationship between the second fitting recess and the first fitting projection is a clearance fit. In this arrangement, in the invention according to the second aspect and the third aspect, the second fitting recess is widened by the interference fit, and thus the fitting relationship therearound other than that between second fitting recess and the first fitting projection becomes a interference fit, thereby having an advantage in that the key sheet is easily fitted to the cover and hardly detached after fitted once.

The fourth aspect of the present invention is a mobile wireless apparatus having a key controlling panel constructed by joining a key sheet having key tops thereon and a cover having holes into which the key tops are inserted, wherein the cover is provided with a first fitting recess and a first fitting projection within the first recess, and the key sheet is provided with a second fitting projection and a second fitting recess in the center of the second projection, so that the fitting recess and the fitting projection is press fitted when inserting the key tops into the key top holes, whereby the key sheet is easily fitted to the cover and hardly detached after fitted once.

The fifth aspect of the present invention is a mobile wireless apparatus according to the fourth aspect, wherein the first fitting projection formed in the first fitting recess is a boss erecting on the cover, whereby the key sheet is easily attached and hardly detached after fitted thereon though the structure is simple.

The sixth aspect of the present invention is a mobile wireless apparatus according to the fifth aspect, wherein the configuration of the boss is cylindrical, thereby having an advantage in that the key sheet is easily attached and hardly detached after fitted once.

The seventh aspect of the present invention is a mobile wireless apparatus according to the fourth aspect, wherein the first fitting recess having a first fitting projection therein formed on the cover is formed symmetrically about the vertical centerline of the cover, and the fitting recess formed on the upper end of the cover is positioned on the left and right ends of the cover, and the first fitting recess formed on the lower end is located in the vicinity of the vertical centerline of the cover, thereby having an advantage in that the key sheet is easily attached and hardly detached after fitted once regardless even though only small numbers of fixing positions can be provided due to downsizing.

The eighth aspect of the present invention is a mobile wireless apparatus according to the seventh aspect, wherein the first fitting recess formed on the upper end is deeper than the first fitting recess formed on the lower end, thereby having an advantage in that the key sheet is easily attached and hardly detached after fitted once.

The ninth aspect of the present invention is a mobile wireless apparatus according to the fourth aspect, wherein the second fitting projection having the second fitting recess in the center formed on the key sheet is hollow cylindrical shape formed of the same material as the key sheet, thereby having an advantage in that the key sheet is easily attached and hardly detached after fitted once though the construction is simple.

The tenth aspect of the present invention is a mobile wireless apparatus according to the ninth aspect, wherein the key sheet is formed of silicone rubber, thereby having an advantage in that the key sheet is easily attached and hardly detached after fitted once though the construction is simple.

The eleventh aspect of the present invention is a mobile wireless apparatus according to the fourth aspect, wherein the second fitting projection having a second fitting recess in the center formed on the key sheet is formed symmetrically about the vertical centerline of the key sheet, and the second fitting projection formed on the upper end is positioned on the left and right ends of the key sheet, and the second fitting projection formed on the lower end is located in the vicinity of the vertical centerline of the key sheet, thereby having an advantage in that the key sheet is easily attached and hardly detached after fitted once even though only small numbers of fixing positions can be provided due to downsizing.

The twelfth aspect of the present invention is a mobile wireless apparatus according to the eleventh aspect, wherein the second fitting projection formed on the upper end thereof is higher than the second fitting projection formed on the lower end thereof, thereby having an advantage in that the key sheet is easily attached and hardly detached after fitted once.

What is claimed is:

1. A mobile wireless apparatus having a key controlling panel constructed by joining a key sheet having key tops thereon and a cover having holes into which the key tops are inserted, comprising:
    a first fitting recess provided on one of the cover and the key sheet;
    a first fitting projection provided in the first fitting recess;
    a second fitting projection provided on the other one of the cover and the key sheet; and
    a second fitting recess provided in the center of the projection,
    wherein the fitting recess and the fitting projection are press fitted when inserting the key tops into the key top holes.

2. A mobile wireless apparatus according to claim 1, wherein the first fitting projection and the second fitting recess are interference fitted with respect to each other.

3. A mobile wireless apparatus according to claim 1, wherein fitting relationship between the first fitting projection and the second fitting recess is a interference fit, and fitting relationship other than the fitting relationship between the second fitting recess and the first fitting projection is a clearance fit.

4. A mobile wireless apparatus having a key controlling panel constructed by joining a key sheet having key tops thereon and a cover having holes into which the key tops are inserted, comprising:
    a first fitting recess provided on the case;
    a first fitting projection formed within the recess;
    a second fitting projection provided on the key sheet; and
    a second fitting recess provided in the center of the projection,
    wherein the fitting recess and the fitting projection is press fitted when inserting the key tops into the key top holes.

5. A mobile wireless apparatus according to claim 4, wherein the first fitting projection is a boss erecting on the cover.

6. A mobile wireless apparatus according to claim 5, wherein the configuration of the boss is cylindrical.

7. A mobile wireless apparatus according to claim 4,
    wherein the mobile wireless apparatus includes a plurality of the first fitting recess formed on the upper end and lower end of the cover and symmetrically about the vertical centerline of the cover,
    wherein the first fitting recesses formed on the upper end of the cover is positioned on the left and right ends of the cover,
    wherein the first fitting recesses formed on the lower end is located in the vicinity of the vertical centerline of the cover.

8. A mobile wireless apparatus according to claim 7, wherein the first fitting recess formed on the upper end is deeper than the first fitting recess formed on the lower end.

9. A mobile wireless apparatus according to claim 4, wherein the second fitting projection is hollow cylindrical shape formed of the same material as the key sheet.

10. A mobile wireless apparatus according to claim 9, wherein the key sheet is formed of silicone rubber.

11. A mobile wireless apparatus according to claim 4,
    wherein the mobile wireless apparatus includes second fitting projections formed on an upper end and a lower end of the key sheet and symmetrically about the vertical centerline of the key sheet,
    wherein the second fitting projections formed on the upper end is positioned on the left and right ends of the key sheet,
    wherein the second fitting projections formed on the lower end is located in the vicinity of the vertical centerline of the key sheet.

12. A mobile wireless apparatus according to claim 11, wherein the second fitting projection formed on the upper end thereof is higher than the second fitting projection formed on the lower end thereof.

* * * * *

UNITED STATES PATENT AND TRADEMARK OFFICE
CERTIFICATE OF CORRECTION

PATENT NO.    : 6,718,188 B1
DATED         : April 6, 2004
INVENTOR(S)   : Akinori Ohira et al.

It is certified that error appears in the above-identified patent and that said Letters Patent is hereby corrected as shown below:

Please delete drawing sheets 1 through 5 and replace with the attached formal drawings.

Signed and Sealed this

Ninth Day of August, 2005

JON W. DUDAS
*Director of the United States Patent and Trademark Office*